US007077741B2

(12) United States Patent
Brenner et al.

(10) Patent No.: US 7,077,741 B2
(45) Date of Patent: Jul. 18, 2006

(54) SAFETY SYSTEM FOR AN APPARATUS FOR GENERATING ENERGY

(75) Inventors: Frank Brenner, Remseck (DE); Martin Moeller, Stuttgart (DE); Rainer Saliger, Freiberg (DE); Thomas Hebner, Stuttgart (DE); Kai Kroeger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 10/634,890

(22) Filed: Aug. 6, 2003

(65) Prior Publication Data

US 2004/0063394 A1 Apr. 1, 2004

(30) Foreign Application Priority Data

Aug. 19, 2002 (DE) .......................................... 102 37 834

(51) Int. Cl.
*B60H 1/02* (2006.01)

(52) U.S. Cl. ..................................... 454/75; 237/12.3 R
(58) Field of Classification Search ................ 237/2 A, 237/12.3 B, 12.3 C, 12; 165/41, 42
See application file for complete search history.

(56) References Cited

U.S. PATENT DOCUMENTS

| | | | | | |
|---|---|---|---|---|---|
| 4,638,443 | A | * | 1/1987 | Kaneyasu et al. ............. 702/24 |
| 5,132,663 | A | * | 7/1992 | Strobl et al. ................. 340/438 |
| 5,964,089 | A | * | 10/1999 | Murphy et al. ............... 60/286 |
| 6,155,099 | A | * | 12/2000 | Kobayashi et al. ......... 73/31.05 |
| 6,290,594 | B1 | * | 9/2001 | Osborne ...................... 454/75 |
| 6,294,277 | B1 | * | 9/2001 | Ueno et al. .................... 429/22 |
| 6,429,019 | B1 | * | 8/2002 | Goldstein et al. ........... 436/134 |
| 6,451,464 | B1 | * | 9/2002 | Edlund et al. ................. 429/19 |
| 6,596,236 | B1 | * | 7/2003 | DiMeo et al. ................ 422/88 |
| 6,794,070 | B1 | * | 9/2004 | Amrhein et al. .............. 429/19 |

FOREIGN PATENT DOCUMENTS

DE    199 59 699 C1    3/2001

* cited by examiner

*Primary Examiner*—Derek S. Boles
(74) *Attorney, Agent, or Firm*—Ronald E. Greigg

(57) ABSTRACT

A safety system for a gas-operated apparatus for generating energy, in particular in a vehicle, includes at least one sensor for measuring the gas concentration. The sensor is preferably disposed in the passenger compartment of the vehicle. In the event of a dangerously high gas concentration, a fan and/or power window control is triggered via a control unit in such a way that the fastest possible air exchange in the passenger compartment of the vehicle results.

13 Claims, 2 Drawing Sheets

SAFETY SYSTEM FOR AN APPARATUS FOR GENERATING ENERGY

BACKGROUND OF THE INVENTION

1. Field of the Invention

The invention relates to an improved safety system for a gas operated device for generating energy.

2. Description of the Prior Art

It is generally assumed that hydrogen will be gaining ever-increasing significance for both stationary and mobile applications. For a transitional phase, or in other words as long as a completely satisfactory solution to the problems of regenerative hydrogen production, infrastructure, and storage have not yet been found, the possibility is also entertained of generating hydrogen by re-forming it, on board a vehicle itself. This is known for instance from German Patent Disclosure DE 199 34 649 A1. The hydrogen can be used both in a conventional internal combustion engine or in a fuel cell for driving the vehicle itself. Fuel cells are also provided not only to drive the vehicle but also as an energy source for supplying auxiliary systems of the vehicle. The use of a novel propellant in general, and what is even more, a very highly volatile gas with a wide explosive range, such as hydrogen, in a vehicle makes correspondingly stringent demands in terms of safety. In addition, the use of hydrogen calls a great many negative associations to mind, so adequate acceptance of this energy source can be likely only in conjunction with a solid, conclusive safety concept. If hydrogen escapes unintentionally in the absence of three-dimensional barriers above it, then it escapes into the atmosphere and is virtually no threat to safety. However, if hydrogen can collect in closed spaces and is prevented from escaping into the atmosphere, a gas concentration in the dangerous range can result. That is, the gas concentration can become so high that there is the risk of fire or even explosion.

OBJECT AND SUMMARY OF THE INVENTION

As a solution to this problem, the invention proposes a simple, operationally safe and reliable safety system for a gas-operated apparatus for generating energy in which the device, optionally together with a gas supply, is disposed in the vicinity of an occupied space, but spatially separated from it. The invention is especially suitable for gas-operated apparatuses for generating energy for vehicles driven by gas, or for gas-operated auxiliary devices attached to the vehicle. As understood in this application, "gas-operated" accordingly means that the vehicle is equipped with either a gas-operated internal combustion engine or a fuel cell for driving the vehicle, or with a fuel cell for supplying energy to auxiliary systems. The safety system is especially well suited to devices of the generic type that are operated with hydrogen. The proposed solution is based on the recognition that if a still harmlessly low gas concentration is detected in good time, it is possible to initiate safety provisions that prevent the gas concentration from increasing further into the dangerous range. To that end, in an especially advantageous way, if hydrogen is discovered outside the passenger compartment of a vehicle, the passenger compartment is blocked off from the penetration of hydrogen gas. If hydrogen gas occurs in the passenger compartment itself, then provision is made for the fastest possible reduction in the gas concentration by means of forced ventilation. In especially critical situations, that is, if there is a high concentration of hydrogen gas in the explosive range, the entire electrical system of the vehicle can be switched off to preclude the development of sparks. In all situations that are potentially dangerous, vehicle passengers are warned by means of acoustical and/or optical signals from a warning device.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
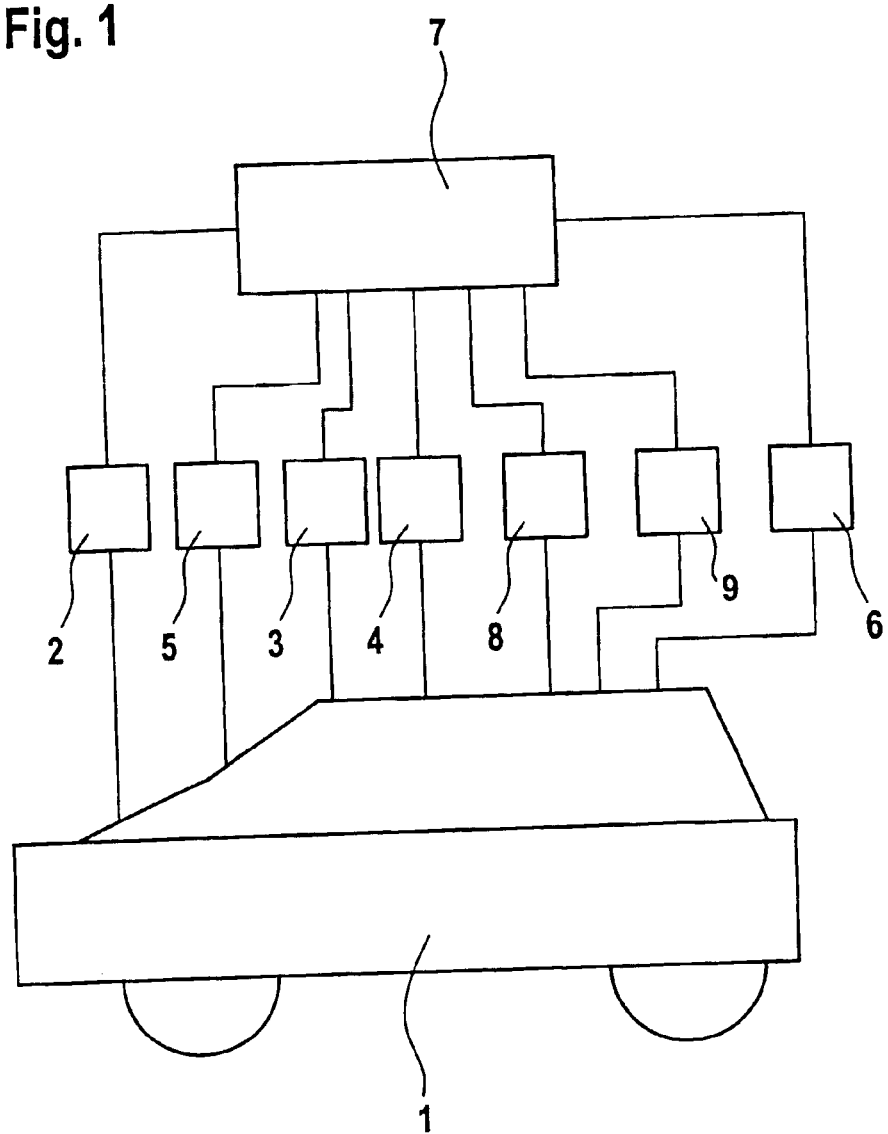
FIG. 1 schematically shows a gas-operated vehicle, with its safety system shown as a block circuit diagram.

FIG. 1 shows a gas-operated vehicle 1, shown here schematically as a passenger car, with a safety system shown in the form of a block circuit diagram. Reference numeral 2 designates a first sensor, which is sensitive in particular to hydrogen gas. The sensor 2 is disposed outside the passenger compartment and preferably in the engine compartment of the vehicle 1. Reference numeral 6 indicates a second sensor, which is in particular likewise sensitive to hydrogen gas. This sensor 6 is preferably disposed in the passenger compartment itself. Reference numeral 7 designates a control unit, to which the output signals of the sensors 2, 6 are delivered and which evaluates these output signals. Reference numeral 3 designates a fresh-air valve, which serves to deliver fresh air to the passenger compartment of the vehicle 1. Reference numeral 4 designates power window controls of the vehicle 1. Reference numeral 5 designates a fan that controls the delivery of air to the passenger compartment of the vehicle 1. This can in particular be the fan of the ventilation and/or air conditioning system with which the vehicle 1 is equipped in mass production. Reference numeral 8 indicates a control unit or relay that is capable of interrupting the central power supply of the vehicle 1. Reference numeral 9 indicates a warning device, which can output acoustical and/or optical warning signals. The components of the safety system that are designated by reference numerals 3, 4, 5, 6, 8, 9 are likewise connected to the control unit 7 and can be controlled by it.

Figure 2:
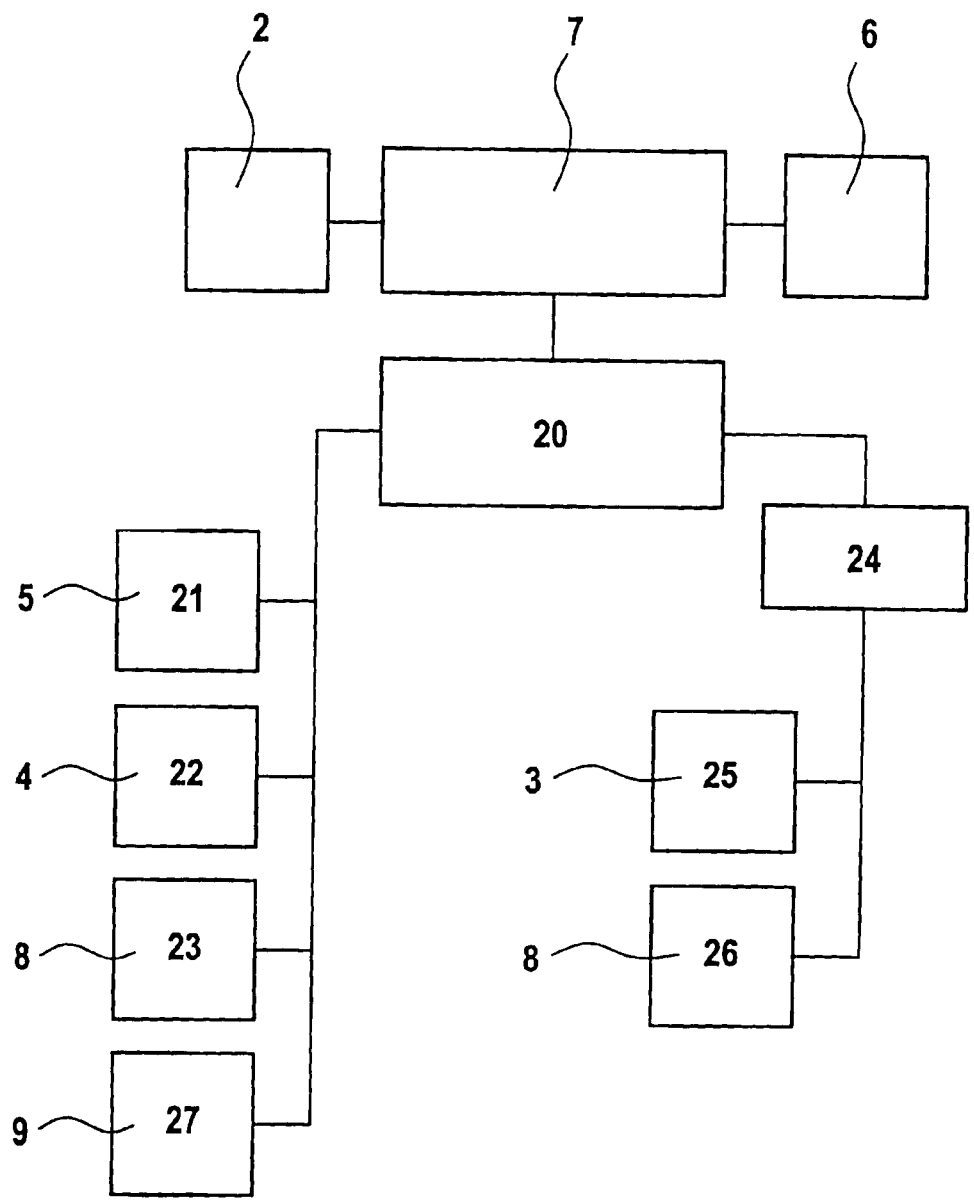
FIG. 2 is a block circuit diagram to explain the mode of operation of the safety system.

The mode of operation of the safety system will now be described in conjunction with the block diagram shown in FIG. 2. Here a distinction is made between various dangerous situations. In a first dangerous situation, the sensor 6 is not reporting any hydrogen gas in the passenger compartment of the vehicle 1 (step 20), but the sensor 2 does find hydrogen gas in the engine compartment of the vehicle 1 (step 24). The output signal of the sensor 2 is delivered to the control unit 7, which assesses this output signal and triggers switching means as needed. In the normal situation, the hydrogen gas detected in the engine compartment is not an excessive potential risk to the vehicle passengers, since the strong air flow in the engine compartment of the vehicle 1 provides for rapid dilution of the hydrogen gas concentration, and thus a dangerous gas concentration does not arise. To eliminate any residual risk whatever to the vehicle passengers, however, the invention provides (step 25) that a fresh-air valve 3 if present is triggered by the control unit 7 in such a way that the entry of outside air to the passenger compartment of the vehicle 1 is suppressed, at least until such time as the output signal of the sensor 2 signals that hydrogen gas is no longer detected. In addition, a warning device 9 can be triggered (step 27), which outputs an optical and/or acoustical signal and makes the vehicle passengers aware of the dangerous situation.

In a second dangerous situation, the sensor 6 detects a harmful hydrogen concentration in the passenger compartment of the vehicle 1 itself (step 20). The control unit 7 assesses the output signal of the sensor 6 and then triggers the fan 5 (step 21), which then blows air into the passenger compartment and in this way reduces the harmful gas concentration to a harmless value. The control unit 7 can additionally trigger power window controls 4 (step 22), which cause the windows of the vehicle to be lowered, so as in this way to make an even faster air exchange possible. In addition, a sun roof and/or a safety valve disposed in the region of the roof of the vehicle 1, if the vehicle 1 is equipped with such accessory devices, can be opened. On the condition that the sensor 2 detect no harmful concentration of hydrogen gas in the engine compartment of the vehicle 1, the fresh-air valve 3 can additionally be triggered by the control unit 7 in such a way that it assumes its maximally open position. With the provisions named thus far, a very fast air exchange in the passenger compartment is attainable, so that the harmful gas concentration of hydrogen gas is eliminated as fast as possible. In addition, as already noted above, the warning device 9 can be triggered. The vehicle passengers are thereupon made aware of the existing dangerous situation by means of an optical and/or acoustical signal.

In a third dangerous situation, both sensors 2, 6 report a dangerous concentration of hydrogen gas, both outside the passenger compartment and inside the passenger compartment of the vehicle 1 (steps 20, 24). In this case, first the fan 5 (step 21) and/or the power window controls 4 (step 22) are triggered by the control unit 7. The fresh-air valve 3 is also triggered (step 25) in such a way that it assumes its closed position. In this way, hydrogen-enriched fresh air is prevented from being carried into the passenger compartment. In turn, triggering the fan 5 and/or the power window control 4 assures the fastest possible air exchange outside the passenger compartment, and so a harmful concentration of hydrogen gas is eliminated as fast as possible. As already described above, once again the vehicle passengers can be made aware of the dangerous situation by means of an acoustical and/or optical signal output by the warning device 9 (step 24). If neither the sensor 2 nor the sensor 6 measures a harmful concentration of hydrogen gas, then the control unit 7 assumes that the dangerous situation has been overcome. The fresh-air valve 3, the power window controls 4 and the fan 5 are thereupon triggered such that they assume their normal position. In this normal position, the windows are as a rule closed, while the fresh-air valve 3 is at least partly open. If no further control signals, for instance from a temperature sensor, not shown, are delivered to the fan 5, then it is again in the position of repose. By the provisions described above, the fastest possible air exchange in the passenger compartment is achieved. In this way, if a risky concentration of hydrogen gas is possibly present, it is reduced to a harmless level as fast as possible.

Depending on the risk assessment performed by the control unit 7, if there is an especially high, dangerous concentration of hydrogen gas, it is possible for safety reasons for the control unit 8 also to be triggered by the control unit 7 (steps 23, 26), in such a way that the entire power supply to the vehicle 1 is interrupted.

This is expediently done not until after a certain time lag, once the vehicle passengers, via the warning device 9, have been made aware of the dangerous situation by means of an acoustical and/or optical signal. In this way, the driver still has enough time in an emergency to steer the vehicle 1 out of traffic onto the shoulder of the road and bring it to a stop.

The safety system of the invention has been described above in conjunction with a vehicle-bound device for generating energy. It is understood that the invention can also be employed in a stationary device for generating energy.

The foregoing relates to preferred exemplary embodiments of the invention, it being understood that other variants and embodiments thereof are possible within the spirit and scope of the invention, the latter being defined by the appended claims.

We claim:

1. A safety system for a gas-operated apparatus for generating energy, in which the apparatus, optionally along with a gas supply, is disposed in the vicinity of an occupied space but spatially separated from it, the safety system comprising
    at least one gas-sensitive sensor (6) in the occupied space;
    a control unit (7), which evaluates the output signal of the sensor (6); and
    means for reducing the gas concentration in the occupied space;
    the control unit (7), being operable to reduce the gas concentration in the occupied space as a function of the gas concentration ascertained by the sensor (6), wherein the gas-operated apparatus for generating energy is disposed in a vehicle (1); and wherein the occupied space is the passenger compartment of a vehicle, further comprising power control means (8) responsive to the control unit (7) operable to interrupt the power supply to the vehicle (1) as a function of the potential danger based on the gas concentration ascertained by the sensors (2, 6).

2. The safety system according to claim 1 wherein the gas-operated apparatus for generating energy is a gas-operated internal combustion engine for driving the vehicle (1).

3. The safety system according to claim 1, wherein the gas-operated apparatus is a fuel cell operable either for driving the vehicle (1) or as an energy source for accessory systems of the vehicle (1).

4. The safety system according to claim 1, wherein the sensor (6) is disposed in the passenger compartment of the vehicle (1).

5. The safety system according to claim 1, further comprising a second sensor (2), which is disposed outside the passenger compartment of the vehicle (1), in particular in the engine compartment of the vehicle (1).

6. The safety system according to claim 5, wherein the sensors (2, 6) are sensitive to hydrogen gas.

7. The safety system according to claim 1, wherein a fresh-air valve (3), power window controls (4), a fan (5), and a warning device (9) are triggerable by the control unit (7) as a function of the output signals from the sensors (2, 6).

8. The safety system according to claim 1, further comprising a warning device is triggered by the control unit (7), which device outputs an optical and/or acoustical signal to warn the vehicle passengers, when a dangerous situation is ascertained by the sensors (2, 6).

9. The safety system according to claim 1, wherein, if a harmful concentration of hydrogen gas is detected in the passenger compartment of the vehicle (1) by the sensor (6), the control unit (7) is triggered to operate at least one fan (5) and/or power window control (4) in such a way that the fastest possible air exchange in the passenger compartment of the vehicle (1) is made possible.

10. A safety system for a gas-operated apparatus for generating energy, in which the apparatus, optionally along with a gas supply, is disposed in the vicinity of an occupied space but spatially separated from it, the safety system comprising at least one gas-sensitive sensor (6) in the occupied space;

a control unit (7), which evaluates the output signal of the sensor (6); and means for reducing the gas concentration in the occupied space;

the control unit (7), being operable to reduce the gas concentration in the occupied space as a function of the gas concentration ascertained by the sensor (6), wherein the gas-operated apparatus for generating energy is disposed in a vehicle (1), and wherein the occupied space is the passenger compartment of a vehicle (1), further comprising a second sensor (2), which is disposed outside the passenger compartment of the vehicle (1), wherein, when a harmful concentration of hydrogen gas is measured in the engine compartment of the vehicle (1) by the sensor (2), the control unit (7) triggers at least the fresh-air valve (3) in such a way that it is in the closed position.

11. The safety system according to claim 10, wherein, when a harmful gas concentration of hydrogen gas is measured by both the sensor (2) and the sensor (6), the control unit (7) triggers the fresh-air valve (3) in such a way that it is in the closed position; and that the power window controls (4) and/or the fan (5) is triggerable by the control unit (7) in such a way that the fastest possible air exchange in the passenger compartment of the vehicle (1) results.

12. The safety system according to claim 10, further comprising a warning device is triggered by the control unit (7), which device outputs an optical and/or acoustical signal to warn the vehicle passengers, when a dangerous situation is ascertained by the sensors (2, 6).

13. A safety system for a gas-operated apparatus for generating energy, in which the apparatus, optionally along with a gas supply, is disposed in the vicinity of an occupied space but spatially separated from it, the safety system comprising at least one gas-sensitive sensor (6) in the occupied space;

a control unit (7), which evaluates the output signal of the sensor (6); and means for reducing the gas concentration in the occupied space the control unit (7) being operable to reduce the gas concentration in the occupied space as a function of the gas concentration ascertained by the sensor (6), wherein the gas-operated apparatus for generating energy is disposed in a vehicle (1); and wherein the occupied space is the passenger compartment of a vehicle (1), and wherein a safety valve disposed in the region of the roof of the vehicle (1) can be opened by the control unit (7) to reduce the gas concentration in the occupied space as a function of the gas concentration ascertained by the sensor (6).

* * * * *